United States Patent

[11] 3,575,528

| [72] | Inventors | Paul E. Beam, Jr;<br>Esten W. Spears, Jr, Indianapoles, Ind. |
|---|---|---|
| [21] | Appl. No. | 770,920 |
| [22] | Filed | Oct. 28, 1968 |
| [45] | Patented | Apr. 20, 1971 |
| [73] | Assignee | General Motors Corporation<br>Detroit, Mich. |

[54] TURBINE ROTOR COOLING
11 Claims, 3 Drawing Figs.

[52] U.S. Cl...................................................... 416/39,
416/97, 415/12, 60/39.66
[51] Int. Cl........................................................ F01d 5/08
[50] Field of Search.......................................... 415/12,
115, 175; 416/95, 39; 60/39—66; 251/11; 137/67;

[56] References Cited
UNITED STATES PATENTS

| 2,787,440 | 4/1957 | Thompson..................... | 415/12 |
| 2,811,833 | 11/1957 | Broffitt......................... | 60/39.66 |
| 2,906,494 | 9/1959 | McCarty et al............... | 416/39 |
| 2,951,340 | 9/1960 | Howald......................... | 60/39.66 |

*Primary Examiner*—Samuel Feinberg
*Attorneys*—Paul Fitzpatrick and F. W. Christen ABSTRACT: Flow of cooling air through the rotor of a gas turbine is varied by a valve mounted in the rotor including a bimetal ring which warps as a function of temperature to vary an annular valve opening. Centrifugal force also may affect the valve to a desired extent.

PATENTED APR 20 1971  3,575,528
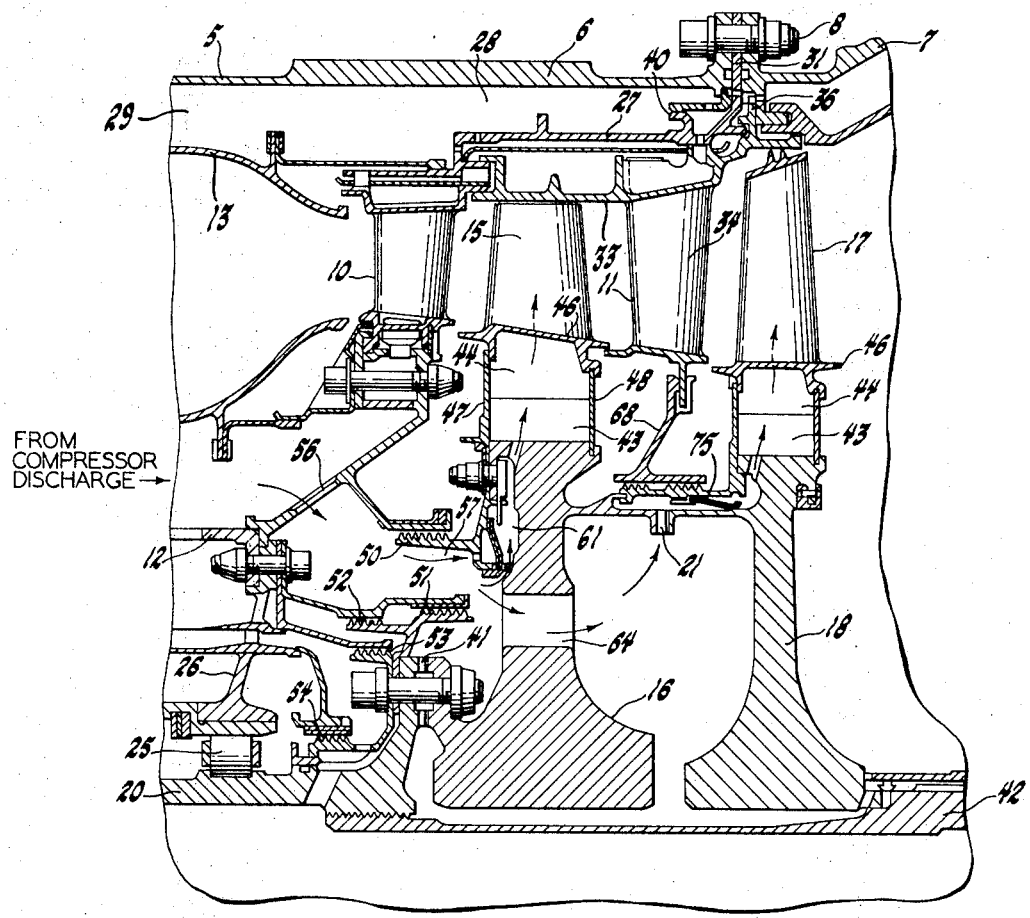
Fig.1
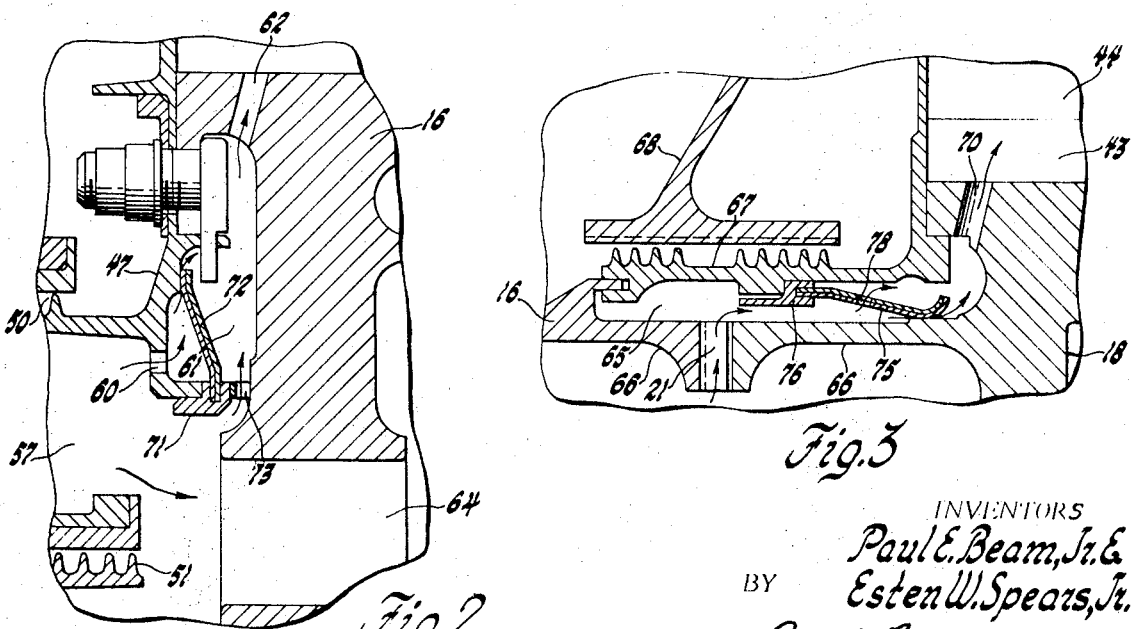
Fig.2
Fig.3
INVENTORS
Paul E. Beam, Jr. &
Esten W. Spears, Jr.
BY
Paul Fitzpatrick
ATTORNEY

TURBINE ROTOR COOLING

The invention herein described was made in the course of work under a contract or subcontract thereunder with the Department of Defense.

Our invention relates to the cooling of turbine rotors and particularly to an improved valve or control means to regulate the flow of a cooling fluid such as compressor discharge air or combustion chamber jacket air to wheels and blades of a gas turbine.

The need for cooling of the parts of very high temperature turbines such as the early stages of the turbines of gas turbine engines is very well known. The efficiency and specific output of such an engine increase with increasing temperature of the motive fluid but the tolerance of materials used for vanes and blades is limited without provision of cooling.

In many schemes for cooling gas turbine engines, a proportion of the compressor discharge air determined by fixed metering passages is allowed to flow to the parts of the turbine to be cooled at all times. Such diversion of air from the compressor for cooling imposes a penalty on power output and efficiency of the engine. Thus, it is highly desirable to shut off or diminish the flow of cooling air at low load or low-power output conditions of the engine when the temperature is not so high as to create any need for cooling.

Our invention is particularly directed to a simple and effective structure very well adapted to provide such control or regulation of the supply of cooling air to a turbine rotor. Our invention also involves what we believe to be a novel valve adapted to be controlled primarily by the temperature of the fluid which the valve acts to control, and also if desired by centrifugal force due to rotation of the rotor.

The principal objects of our invention are to improve the efficiency and economy of gas turbine engines, to provide improved means for cooling the rotor of a gas turbine which responds to conditions indicative of the need for cooling, to provide a simple reliable valve for turbine cooling air which responds primarily to the temperature of the cooling air, and to provide an annular valve which responds to local temperatures by thermal distortion of a bimetal ring which is one of the parts which coact to form the valve.

The nature of our invention and the advantages thereof will be apparent to those skilled in the art from the succeeding detailed description of the preferred embodiment of the invention and the accompanying drawings thereof.

FIG. 1 is a sectional view of a two-stage high temperature gas turbine taken on a plane containing the axis of rotation of the turbine.

FIG. 2 is an enlarged view of a portion of FIG. 1 illustrating the first stage cooling control valve is closed condition.

FIG. 3 is a view similar to FIG. 2 showing the second stage cooling control valve.

Referring to the drawings, FIG. 1 shows a high temperature turbine providing a suitable environment for our invention which, however, may be employed in turbines of various configurations. The turbine of FIG. 1 has a case 5 which includes an upstream section 6 of cylindrical configuration and a downstream section 7 joined at a bolting flange by a ring of bolts 8. A first stage turbine nozzle 10 and a second stage turbine nozzle 11 are mounted within the case. A combustion apparatus is defined between the outer case 5 and an annular inner wall 12. Motive fluid is discharged from a combustion liner 13 into the first stage turbine nozzle through which it flows to a ring of blades 15 on a first stage turbine wheel 16, then through the second stage nozzle 11 to a ring of blades 17 on a second stage turbine wheel 18. These wheels are suitably mounted on a shaft 20 and are splined together at 21. The rotor comprising wheels 16 and 18 and shaft 20 is rotatively supported by means including a roller bearing 25 mounted in a support 26 which extends inwardly from the first stage nozzle 10.

The details of the turbine stator are quite immaterial to our present invention. The particular stator shown incorporates means for cooling the stator which is described fully in an application of Beam, Hunt, and Spears for Turbine Stator Cooling Control Ser. No. 770,919, filed Oct. 28, 1968. However, it will be described here briefly.

The turbine case is of double-wall construction including an inner wall cylinder 27 which defines with the case section 6 an annular passage 28 for turbine stator cooling air. This passage may be a continuation of the jacket space or passage 29 between the combustion liner 13 and the outer case 5. The inner wall 27 has a radial flange 31 at its rear end which is held between the flanges of case sections 6 and 7 by the bolts 8, thus mounting the inner wall rigidly in the turbine case. The forward end of the inner wall includes a portion which provides the outer support for the first stage turbine nozzle. The inner margin of the first stage turbine nozzle is bolted to a continuation of the combustion case inner liner 12.

The second stage turbine nozzle 11 includes an outer shroud 33 from which nozzle vanes 34 extend inwardly. The shroud 33 also provides a fixed shroud around the tips of the blades of the first and second stage rotor wheels. Shroud 33 is constituted in this case by 20 segments each supported by an outwardly extending flange 36 connected to the case 5.

Flow of cooling air to the second stage nozzle vanes is controlled by a temperature-responsive valve 40 which is the subject of the above-mentioned application of Beam, Hunt, and Spears. The internal structure of the vane is immaterial to the present invention. The air may be distributed through and from the vane in any way desired.

Proceeding now to description of the rotor of the turbine, as previously stated, the illustrative rotor consists of first and second stage wheels 16 and 18 bearing blades 15 and 17, respectively, the wheels being mounted on a shaft 20 and having flanges splined together at 21. Wheel 16 may be connected by splines and bolts at 41 to a flange on shaft 20 and wheel 18 is held to wheel 16 by a tie bolt 42 forming part of the shaft 20. Each wheel bears a ring of blades having roots 43, stalks 44, and platforms 46. Front and rear seal plates or seal rings 47 and 48, respectively, close off the gap between the turbine wheel and blade platforms to flow axially of the turbine and define a chamber between wheel rim and platforms. Such turbine structure is well known. The inner margin of the seal plates 47 of the first stage define the inner member 50 of a labyrinth seal cooperating with structure on the engine inner wall 12. Additional labyrinth seals at 51, 52, 53 and 54 seal between the rotor and the fixed structure of the engine.

An opening or openings 56 in the inner wall 12 provide an entry for combustion chamber jacket air to the rotor for cooling the rotor. This air flows through the annular gap between labyrinth seals 50 and 51 into a space 57. Some of the cooling air thus supplied to the space 57 flows through a ring of holes 60 (FIG. 2) in the seal plate 47 and thus into a cooling air chamber 61 between the seal plate 47 and the forward face of wheel 16. From this space the air flows through holes 62 in the rim of the wheel to the blades through which it is circulated in any suitable way.

Additional cooling air flows through openings 64 in wheel 16 to the space between wheels 16 and 18. Air for cooling the second stage turbine blades 17 flows from this space through clearances in the splines 21 (see also FIG. 3) into an air chamber 65 defined between the flanges 66 of wheels 16 and 18 and a cylindrical labyrinth seal ring 67 projecting forwardly from the lower edge of the front seal plate 68 of the second stage. The labyrinth seal ring 67 cooperates with a diaphragm 68 mounted on the second stage turbine nozzle. From the air chamber 65 cooling air may flow through a ring of holes 70 in the rim of wheel 18 to cool the second stage turbine blades 17.

The structure so far described is that on which our invention is an improvement, the improvement consisting in the provision of means to control the flow to the blades of the first and second stage wheels so that airflow is generally in accordance with the need for it and waste of cooling air at low engine loads when temperature is low is minimized.

This is accomplished by annular valve means on the wheels which responds primarily to the temperature of the cooling fluid and also to some extent to engine rotational speed. The response to temperature is preferably accomplished by the use of a bimetal ring which warps with change in temperature. The response to speed may be effected by the bias exerted on the elastic ring by centrifugal force, which increases as the square of rotational speed of the rotor. In many gas turbines as load increases the temperature of the cooling air increases with it. Likewise, in many cases, the speed of rotation of the engine increases with power output. By providing valve means which responds in the desired ratio to cooling air temperature and rotational speed, the flow of cooling air may be controlled to approximate the need based upon the power level of the engine and the resulting temperature of the turbine in response to which cooling is required.

One embodiment of our invention is illustrated in the first stage wheel in FIG. 2. The valve means of FIG. 2 comprises a mounting ring 71 piloted within the annular seal plate 47 and pressed against the forward face of turbine wheel 16 by the seal plate. A laminated bimetallic ring valve member 72 of slightly dished configuration is fixed in a circumferential slot in the outer surface of mounting ring 71, in position to bear against the rear face of seal plate 47 under certain conditions. As will be apparent, when the bimetal ring 72 bears against the seal plate, the path for flow of cooling air from holes 60 to holes 62 and thus to the blade is blocked by the valve member. A certain amount of air passes to the wheel under these conditions, however, through a number of notches 73 in the rear face of mounting ring 71 providing an inlet for air from space 57 to the radially outer part of cooling air chamber 61. This air bathes the bimetal ring 72 and, as the temperature of the air increases, the ring tends to flatten because of the greater expansion of its forward layer so that is moves away from the seal plate 47 to allow air to flow through the gap ahead of the valve member 72.

Because of the somewhat conical form of the ring 72, centrifugal force also tends to urge it toward a more nearly plane configuration, thus biasing it away from the seal plate 47.

Similar principles are involved in the cooling valve arrangement for the second stage shown clearly in FIG. 3. In this case, the bimetal ring valve member identified as 75 is nearly cylindrical rather than dish shaped like the valve member for the first stage. The bimetal ring 75 is welded or otherwise fixed to a mounting ring 76 which in turn is piloted within and fixed to the inner surface of the labyrinth seal ring 67. The ring 75 bridges the gap between labyrinth seal ring 67 and the flange 66 on the forward face of wheel 18, thus providing a block to the flow of cooling air except that a number of small holes 78 through the bimetal ring define a bypass for the valve, providing some circulation of the cooling air past the b8matel ring and rendering it sensitive to the temperature of the cooling air. In normal operation at low-power ratings, air flows through the gap defined by splines 71 and through holes 78 and 70 to the blades. As temperature increases, the bimetal flexes away from flange 66 to allow greater airflow. This radial growth of the bimetal ring is also promoted by centrifugal force as a function of rotational speed of the wheel.

It will be seen that the principles of our invention provide a very simple, lightweight, and easily fitted turbine rotor cooling air metering arrangement which is suitable for installation in turbines of various sorts and is effective to improve the efficiency of such engines, particularly at part load operation.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. A turbine rotor comprising, in combination, an annular blade-carrying body mounted for rotation about its axis, a ring of hollow blades mounted on the body, means for conducting cooling fluid to the blades including means on the rotor defining an annular chamber with entrance means for cooling fluid and exit means for cooling fluid to the blades, and an annular valve member extending across the chamber between the entrance and exit means adapted to regulate flow of cooling fluid, the valve member being a bimetallic ring coaxial with the rotor adapted to flex in response to changes in the temperature of the ring, such flexion causing a change in clearance between the valve member and a wall of the chamber.

2. A rotor as recited in claim 1 including means to provide a circulation of cooling fluid over the valve member.

3. A rotor as recited in claim 2 in which the last-mentioned means includes a bypass around the valve member.

4. A rotor as recited in claim 2 in which the last-mentioned means is provided by holes through the valve member.

5. A rotor as recited in claim 1 in which the valve member is disposed so as to respond to centrifugal force due to rotation of the rotor to effect the clearance between the member and the said wall of the chamber.

6. A rotor as recited in claim 5 in which the valve member is dished.

7. A rotor as recited in claim 5 in which the valve member is substantially cylindrical.

8. A turbine rotor comprising, in combination, an annular body mounted for rotation about its axis, a ring of hollow blades mounted on the body, means for conducting cooling fluid to the blades including means on the rotor defining an annular chamber with entrance means for cooling fluid and exit means for cooling fluid to the blades, and an annular valve member extending across the chamber between the entrance and exit means adapted to regulate flow of cooling fluid, the valve member being a metallic ring coaxial with the rotor adapted to vary in form relative to the rotor in response to centrifugal force due to rotation of the rotor, such variation causing a change in clearance between the valve member and a wall of the chamber.

9. A rotor as recited in claim 8 in which the valve member responds differentially to the rotor to temperature of the cooling fluid to effect the clearance between the member and the said wall of the chamber.

10. A rotor as recited in claim 8 in which the valve member is dished.

11. A rotor as recited in claim 8 in which the valve member is substantially cylindrical.

PO-1050
(5/69)

UNITED STATES PATENT OFFICE
CERTIFICATE OF CORRECTION

Patent No. 3,575,528　　　　　　　Dated April 20, 1971

Inventor(s) Paul E. Beam, Jr. and Esten W. Spears, Jr.

It is certified that error appears in the above-identified patent and that said Letters Patent are hereby corrected as shown below:

Column 1, line 51, "is" should read -- in --.

Column 3, line 34, "is" should read -- it --;
line 53, delete "b8matel" and insert -- bimetal --.

Column 4, line 34, "effect" should read -- affect --;
line 55, "effect" should read -- affect --.

Signed and sealed this 15th day of February 1972.

(SEAL)
Attest:

EDWARD M. FLETCHER, JR.　　　　　ROBERT GOTTSCHALK
Attesting Officer　　　　　　　　Commissioner of Patents